Sept. 9, 1969  D. UNGER ET AL  3,465,783
BRANCH CONDUIT CONNECTION FOR FLUID DISTRIBUTION SYSTEMS
Filed Dec. 12, 1966
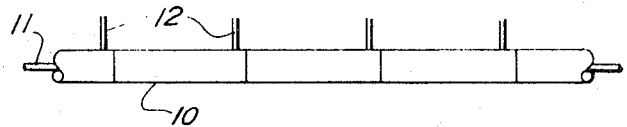
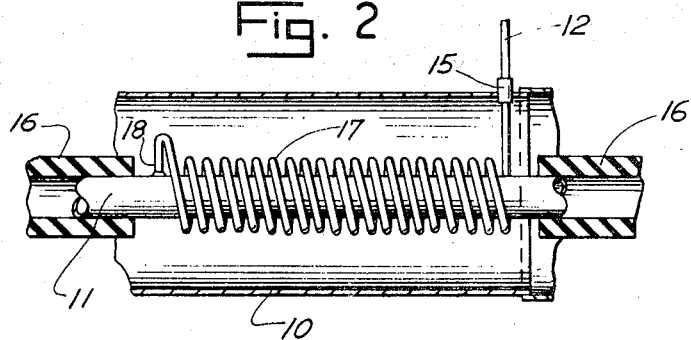
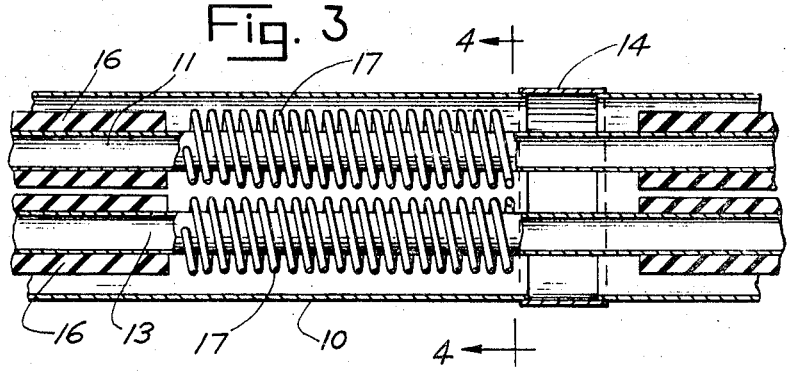
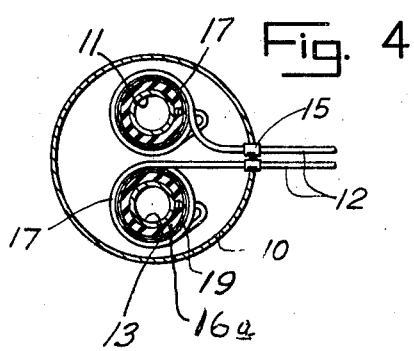
INVENTOR.
DAVID UNGER &
RONALD A. SABALA
BY
Bair, Freeman & Molinare
ATTORNEYS

United States Patent Office 3,465,783
Patented Sept. 9, 1969

3,465,783
BRANCH CONDUIT CONNECTION FOR FLUID DISTRIBUTION SYSTEMS
David Unger, Chicago, and Ronald A. Sabala, Elmwood Park, Ill., assignors to Midwesco-Enterprise, Inc., Chicago, Ill., a corporation of Illinois
Filed Dec. 12, 1966, Ser. No. 601,188
Int. Cl. F16l 51/04, 7/00
U.S. Cl. 137—375     3 Claims

ABSTRACT OF THE DISCLOSURE

In a fluid distribution system of the type intended to be buried in the ground, there is provided an outer tubular casing with a main conduit extending through the casing and branch conduits for delivering fluid from the main conduit to individual points of consumption. The improvement in the system includes a coupling means that secures one end of the branch conduit to the tubular casing, and an elongated third conduit is located within the casing and has one end connected to the coupling means and the other end connected to the main conduit and the third conduit is provided in the form of a helix surrounding the main conduit and being more flexible than the main conduit so as to stretch or compress to accommodate relative lengthwise movement of the main conduit relative to the casing.

---

This invention relates to a branch conduit connection for fluid distribution systems, and more particularly to a flexible connection between main and branch conduits in a distribution system for steam or similar heated fluid to accommodate expansion and contraction of the main conduit.

It has become common practice in many areas to supply a series of connected dwelling units such as connected single-family townhouses, with heating fluid such as steam, by means of main supply and return conduits extending along the row of dwellings and connected thereto by branch conduits. Since the main conduits are subject to expansion and contraction and since the branch conduits must be fixed, it is necessary to provide flexible connections between the main and branch conduits to accommodate such expansion and contraction. It is the primary object of the present invention to provide such a flexible connection.

Another object is to provide a branch conduit connection for a fluid distribution system in which each branch conduit is connected to the main conduit by a third conduit curved between its ends to define portions extending transversely of the axis of the main conduit, and which will flex to accommodate expansion and contraction of the main conduit. Preferably, the third conduit is helically coiled loosely around the main conduit.

According to another feature of the invention, the main conduit or conduits are mounted in a tubular casing and the ends of the third conduit are connected to the main conduit and to the casing at axially spaced points.

The above and other objects and features of the invention will be more readily apparent from the following description when read in connection with the accompanying drawing, in which:

FIGURE 1 is a plan view of a fluid distribution system embodying the invention;

FIGURE 2 is a partial horizontal section illustrating a connection embodying the invention with parts in elevation;

FIGURE 3 is a partial vertical section with parts in elevation of a fluid distribution system connection embodying the invention; and FIGURE 4 is a transverse section on the line 4—4 of FIGURE 3.

A complete fluid distribution system according to the present invention, comprises an outer tubular, protective or insulating casing as indicated at 10 in FIGURE 1, which is adapted to be buried in the ground and through which one or more main conduits, as indicated at 11, may extend. Branch conduits 12 extend from the casing at spaced points to enter individual points of consumption such as individual dwelling units receiving steam from the system. Preferably, the conduits and the outer casing 10 are formed in sections which are connected together end to end when the system is installed, as is well known in the art.

As best seen in FIGURES 2, 3 and 4, the outer casing 10, in this instance, encloses two main conduits 11 and 13, one of which may be a steam supply conduit and the other a steam return conduit. The conduits in each section of the casing terminate at one end substantially flush with the end of the casing and at their other ends may project beyond the ends of the casing. When the sections are assembled end to end, the ends of the conduit which project from one section are connected to the conduits in the next adjacent section by any desired means as, for example, by welding. This type of connection will leave a gap in the casing, which may be closed by a closure ring 14 fitting over the adjacent ends of the casing and welded thereto.

The branch conduits 12, as best seen in FIGURES 2 and 4, are connected to couplings 15 which extend through and are secured in the wall of the casing adjacent to the first named end thereof. The branch conduits 12 are also normally buried in the ground and lead into the dwelling units or other fluid consuming points where they are connected to heating units or the like.

The main conduits 11 and 13 are conventionally covered by tubular insulation as indicated at 16, throughout at least a major portion of their length. During use of the system, however, the main conduits are subject to temperature changes and will expand or contract in response to such changes. Normally, the conduits are anchored to at least one point which would normally be adjacent to the end of a row of buildings and many be provided with an expansion loop at the opposite end of the row of buildings. Since the casing does not move in the ground and the branch conduits are firmly anchored in the ground, it is necessary that a flexible connection be provided between the main conduits and the branch conduits to accommodate expansion and contraction of the main conduits.

Such a flexible connection is provided, according to the present invention, by a third conduit 17 connected at one end to one of the main conduits at point 18 and at its opposite end, to the branch conduit coupling 15. Between its ends, the third conduits 17 is curved to provide portions extending laterially of the axis of the main conduit and which are spaced apart and can thereby flex to accommodate movements axially of the main conduit between the point 18 and the branch conduit coupling 15. In the preferred form as shown, the third conduit is loosely wound in a loose helix around the main conduit and is normally spaced therefrom.

As shown in FIGURES 2 and 3, the portion of the main conduits surrounded by the helical coil 17 is uninsulated. Normally, insulation of this portion of the main conduits is not required, first, because the uninsulated portion constitutes a relatively small part of the total length of the main conduits and secondly, because the winding of the third conduit around the main conduits in itself assists in insulating the main conduits.

However, as shown in FIGURE 4 as an alternative construction, a portion of each main conduit lying within the helical coils, with the exception of the connection point 18, may, if desired, be covered by tubular insulation 16a around which is provided a relatively thin metal covering or lagging 19, such as of 16 gauge steel. The inner surface of the coiled section of the third conduit 17 in FIGURE 4 will normally lie closely adjacent the metal covering 19 but will have sufficient clearance to slide freely thereover to accommodate expansion and contraction of the main conduits and of the third conduits 17. This lagged insulation will also assist in maintaining the coiled portions of the third conduit 17 in correct alignment relative to the main conduits.

As a typical design embodying the principles hereinabove set forth, the main conduit 11 may be 4 inch black steel pipe, and the third conduit is ¾ inch size wrapped in a helix, as at 17, having a mean helix diameter of 7½ inches and a pitch between adjacent helix turns of 1½ inches. The total axial design length of helix 17, of distance between points 18 and 15, depends upon the number of turns of the helix and the projected maximum expansion of the main conduit that is to be accommodated by helix 17. The following table provides typical design values.

| Design length (in.) | No. of turns of helix on 1½" pitch basis | Maximum expansion of main conduit accommodated (in.) |
|---|---|---|
| 12 | 7 | 1.60 |
| 18 | 12 | 3.14 |
| 24 | 16 | 4.36 |
| 30 | 20 | 5.58 |

While two embodiments of the invention have been shown and described in detail, it will be understood that these are for the purpose of illustration only and are not to be taken as a definition of the scope of the invention, reference being had for this purpose to the appended claims.

What is claimed is:

1. In a fluid distribution system of the type that includes an elongated outer tubular casing, a main conduit extending longitudinally through and spaced from said casing, and a branch conduit for receiving fluid from the main conduit and delivering same to a point outwardly of the outer tubular casing, the improvement comprising, in combination: coupling means securing one end of the branch conduit to the tubular casing and providing for passage of fluid through the casing wall, an elongated third conduit located within the casing and having one end thereof connected to said branch conduit through said coupling means and having its other end connected to the main conduit, and said third conduit being of smaller diameter and more flexible than the main conduit and being curved between its ends to define portions extending generally laterally of the main conduit, said third conduit being of a length greater than the shortest distance between the coupling means and the main conduit, whereby it can stretch or compress to accommodate relative lengthwise movement between its ends.

2. A construction as in claim 1 wherein the ends of said third conduit are secured at points spaced longitudinally of each other relative to the longitudinal run of the main conduit, and the third conduit having a portion thereof arranged in the form of a helix that surrounds but is spaced from the main conduit.

3. A construction as in claim 2 in which a tubular body of heat insulating material lies between the main conduit and the helix portion of the third conduit.

References Cited

UNITED STATES PATENTS

| 917,521 | 4/1909 | Baker | 137—375 |
| 1,820,318 | 8/1931 | Paget | 165—163 |
| 2,663,580 | 12/1953 | Shirk | 285—47 XR |
| 2,905,194 | 9/1959 | Smith et al. | 137—561 |
| 2,960,110 | 11/1960 | Levison | 137—561 |

HENRY T. KLINKSIEK, Primary Examiner

U.S. Cl. X.R.

138—111; 285—187